Aug. 28, 1934.  W. S. HENDERSON ET AL  1,971,781
LUBRICATION SYSTEM
Filed May 15, 1933

INVENTORS:
WILLIAM S. HENDERSON
AND WALTER ROE
BY
*Ralph W. Brown*
ATTORNEY.

Patented Aug. 28, 1934

1,971,781

UNITED STATES PATENT OFFICE

1,971,781

LUBRICATION SYSTEM

William S. Henderson and Walter Roe, Milwaukee, Wis., assignors to The Falk Corporation, Milwaukee, Wis., a corporation of Wisconsin Application May 15, 1933, Serial No. 671,131

5 Claims. (Cl. 184—11)

This invention relates to lubricating systems for gear reduction mechanisms.

The prior patent to Hyman Levine, No. 1,704,298, issued March 5, 1929, discloses and claims a lubricating system wherein the several bearings of a gear reduction mechanism are lubricated by lubricant supplied thereto through open channels formed in the housing. In that system the channels are supplied solely by lubricant thrown from the rotating gears.

An object of the present invention is to improve the lubricating system disclosed in said patent by the provision of means effective to withdraw lubricant from the gears and to direct the same into the channels, thereby to assure an adequate supply of lubricant thereto independently of the speed and irrespective of the direction of operation of the gears.

Another object is to provide a wiper element effective to withdraw and collect lubricant from the surface of a rotating gear during rotation thereof in either direction.

Another object is to provide a wiper effective to withdraw and collect liquid from the surface of an upwardly moving object.

A further object of the invention is to provide a lubricant collector that may be manufactured readily and inexpensively, and that may be applied easily to mechanism to be lubricated thereby.

In accordance with the present invention, a gear reduction mechanism having a channel in its case for distributing lubricant to its bearings is provided with lubricant collecting means arranged to withdraw lubricant from a rotating gear wheel of the mechanism and deliver the lubricant to the distributing channel. In order to insure adequate lubrication of the bearings under all conditions of operation, the lubricant collector is so arranged that it wipes lubricant from the gear wheel when it is rotating in either direction and at any speed.

The foregoing and other objects of the invention may be attained by means of the lubricating system described in the following specification as applied to a typical gear reduction mechanism shown in the accompanying drawing, in which, Figure 1 is a plan view of a gear reduction mechanism with part of the upper housing broken away to show the lubricating system embodying the invention.

Figure 1:
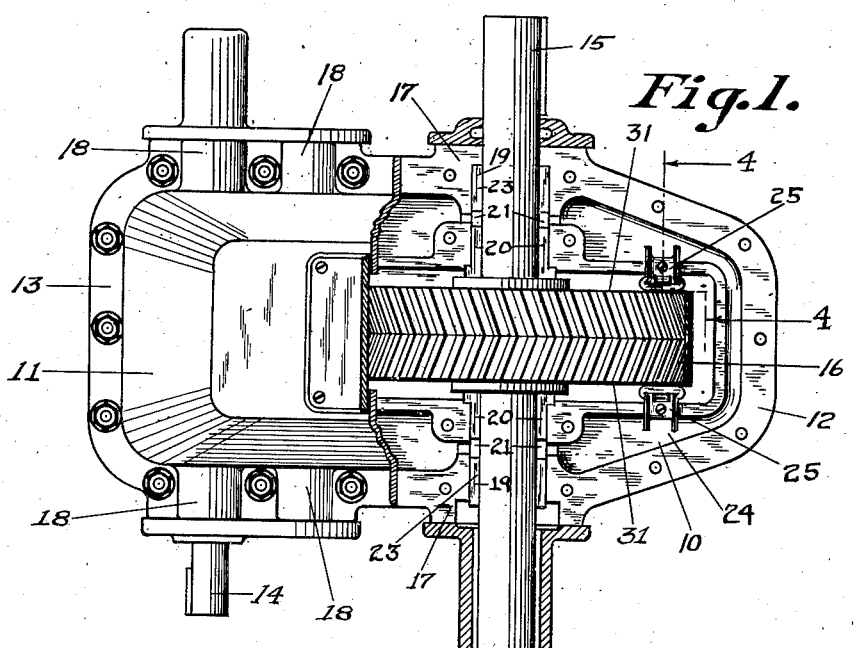

The gear reduction mechanism in connection with which the lubricating system embodying the invention is shown, comprises, in general, a closed housing or gear case within which are mounted power transmitting shafts carrying intermeshing gear wheels.

The gear case is divided along a horizontal medial plane into a lower housing 10 and an upper housing 11. The housings have at their meeting edges flanges 12 and 13, respectively, which fit together to form an oil-tight and dust-proof joint. The reduction mechanism includes a driven or high speed shaft 14 and a driving or low speed shaft 15 arranged in parallel relation transversely of the casing and substantially in the plane of division between the lower housing 10 and the upper housing 11.

The low speed shaft 15 carries a relatively large gear wheel 16 which is driven from the driving shaft 14 by intermediate gear wheels (not shown). The flange 12 on the lower housing is provided with bearing seats 17 which cooperate with corresponding seats 18 in the flange 13 of the upper housing for receiving journal bearings 19 in which the shafts 14 and 15 are journalled for rotation. Each of the journal bearings 19 is divided longitudinally along the plane of division of the housing into two half-bearings 20. Each half-bearing 20 is provided at each side with a notch 21 in its face 23, the notches 21 of each pair of bearing halves being arranged in alignment to constitute openings for admitting lubricant to the journal of the shaft therein.

A supply of oil or other lubricant for the shaft bearings and the gear wheels is stored in the bottom part of the lower housing 10 which constitutes a lubricant reservoir. The quantity of lubricant in the reservoir is maintained such that its depth is sufficient to enable the large gear wheel 16 to dip into it and, in rotating, carry or splash the lubricant upward into the upper housing.

As shown in Fig. 1, the flange 12 of the lower housing 10 is wider than the flange 13 of the upper housing 11 and extends within the housing beneath it, constituting a ledge extending entirely around the gear case. When the gear reduction mechanism is operating at normal speed, the lubricant carried upward by the rotating gear wheels is thrown on to the sides of the upper casing 11 and runs down on to the ledge where it is collected in a lubricating channel 24 formed in the upper surface of the flange 12. The channel 24 communicates with the openings formed by the notches 21 in each of the journal bearings 19 into which the lubricant flows to provide a continuous supply of lubricant to the bearings of the shafts.

In accordance with the present invention, adequate quantities of lubricant are supplied to the channel 24 by collectors or wipers 25 which withdraw and gather lubricant from the sides of the rotating gear wheel 16 and deliver it to the channel 24 under all conditions of operation.

Figure 2:
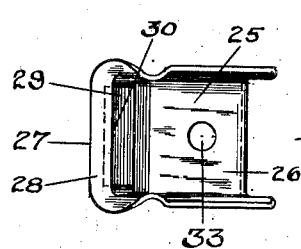
Fig. 2 is an enlarged plan view of the lubricant collector utilized in the system.
Figure 3:
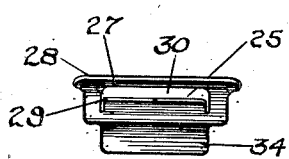
Fig. 3 is a view in end elevation of the lubricant collector.

As shown in Figs. 2 and 3, each lubricant collector 25 is formed by a sheet metal strip bent to channel shape to constitute a trough or chute 26, having one end open and having the other end thereof bent upward to provide an upwardly inclined closure or end portion 27. The upper edge of the end part 27 is bent outwardly forming an upwardly inclined flange or lip 28 disposed to withdraw or wipe lubricant from the rotating gear wheel.

When the part of the gear wheel adjacent the lip 28 is moving downwardly, lubricant is collected on the upper surface of the lip 28 and runs from it down the end part 27 into the trough 26 which is disposed to direct it into the lubricating channel 24.

In order that the lubricant collector may operate when the gear wheel is rotating in the direction to move the part thereof adjacent to the collector upwardly, the end part 27 is provided with a tongue 29 struck outwardly therefrom beneath and substantially parallel with the lip 28 and providing an aperture 30 through the end portion 27 above the tongue 29 and beneath the lip 28. Lubricant wiped from the upwardly moving surface of the gear wheel is collected on the lower surface of the lip 28 and drops therefrom onto the tongue 29 which directs it through the opening 30 into the channel 26.

Figure 4:
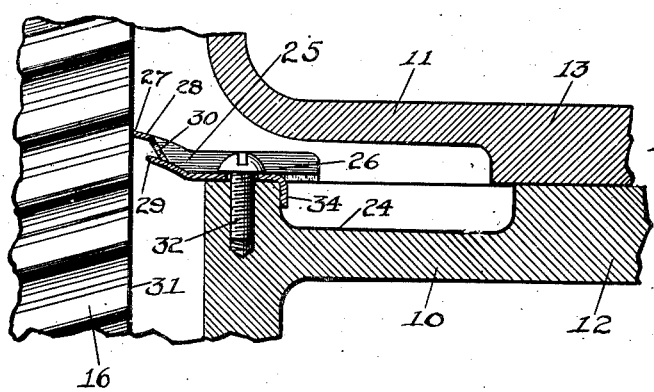
Fig. 4 is a fragmentary view in section taken on the line 4—4 of Fig. 1 showing the collector in longitudinal section and illustrating its relation to the gear wheel and the lubricant channel.

As best shown in Fig. 4, the lubricant collector 25 is arranged upon the inwardly projecting ledge of the flange 12 in such position that the lubricant wiping lip 28 is adjacent or in contact with one of the side faces 31 of the gear wheel 16. The wiper 25 is retained in position by a machine screw 32 which passes through a hole 33 in the middle of the chute 26 and into a threaded socket in the flange 12. To maintain the lip 28 in accurate alignment with the face 31 of the gear wheel, a lug or tang 34 is struck downward from the open discharge end of the chute 26 and bent into engagement with the side wall of the channel 24.

Ordinarily, two lubricant collectors 25 are utilized, one being arranged to collect lubricant from each side face 31 of the gear wheel 16 as shown in Fig. 1.

By means of the lubricating system provided by the present invention and herein described, an adequate supply of lubricant is furnished to the bearings of a gear reduction mechanism under all conditions of operation.

The particular embodiment of the invention herein set forth is susceptible of modification without departing from the spirit and scope of the invention as defined in the subjoined claims. We claim:—

1. In a gear reduction mechanism including a casing, bearings in said casing, a shaft in said bearings, and a gear-wheel carried by said shaft, a lubrication system, comprising a lubricant reservoir formed by said casing, said gear-wheel arranged to dip in lubricant therein, a lubricant supply channel for said bearings, and a wiper element comprising a metal trough leading to said channel and having an upturned end terminating in a lip for wiping lubricant from said gear-wheel during rotation thereof in either direction, and a tongue struck outwardly from said upturned end beneath said lip to form an aperture through said end, said tongue being arranged to receive lubricant from said lip and to deliver it through said aperture into said trough for transmission therefrom into said channel.

2. An oil wiper for collecting oil from the face of a rotating object, comprising a channel shaped metal strip bent upwardly at its end and having the upper edge of said end bent outwardly to form a lip, and a tongue struck outwardly from said upwardly bent end into substantially parallel relation with said lip to provide an opening for admitting into said channel oil which may drip from said lip on to said tongue.

3. An oil wiper for collecting oil from a rotating object, comprising a metal strip turned up at its end, a tongue struck outwardly from said end to provide an aperture and to catch oil and direct it through said aperture, and a lip formed above said tongue at the upper edge of said end to collect oil from said rotating object and deliver it to said tongue.

4. An oil wiper for collecting oil from the surface of an object while said object is moving upwardly, comprising a metal trough having an upturned end with an outwardly turned upper edge arranged to collect oil from said object upon its lower surface, and a tongue struck outwardly from said end beneath said lip to provide an aperture through said end, said tongue being arranged to receive oil from the lower surface of said lip and deliver it through said aperture into said trough.

5. An oil wiper for collecting oil from the surface of an upwardly moving object, comprising a metal trough having an upturned end provided with an outwardly turned upper edge constituting a lip arranged to wipe oil from said object and collect it on its under surface, and a tongue struck outward from said upturned end beneath said lip providing an aperture through said end and arranged to receive oil that drips from the under surface of said lip and to deliver said oil through said aperture into said trough.

WILLIAM S. HENDERSON.
WALTER ROE.